March 10, 1970     J. F. GARDNER     3,499,653
ROTARY MECHANICAL SEAL OF THE GAP TYPE
Filed June 5, 1968

INVENTOR
James F. Gardner
by Charles F. Voytech
Att'y

United States Patent Office 3,499,653
Patented Mar. 10, 1970

3,499,653
ROTARY MECHANICAL SEAL OF THE GAP TYPE
James F. Gardner, Chicago, Ill., assignor to Crane Packing Company, Morton Grove, Ill., a corporation of Illinois
Filed June 5, 1968, Ser. No. 734,814
Int. Cl. F16j 15/16, 15/40
U.S. Cl. 277—27                                10 Claims

ABSTRACT OF THE DISCLOSURE

A rotary mechanical seal of the gap type wherein a predetermined spacing is maintained between the relatively rotatable sealing washers by the geometry of the faces of the washers, the present improvement comprising forming shallow spiral grooves in one of the washer faces to cause a separation of the faces at start-up and thereby prevent damage or destruction to said faces before design pressures are attained.

---

This invention relates to rotary mechanical seals of the gap type, and is an improvement upon the gap seal disclosed and claimed in my copending application filed Apr. 15, 1968, Ser. No. 721,396.

A gap type seal is one wherein the relatively rotatable sealing members are kept from touching one another during the operation of the seal. This characteristic makes them ideal for very high speeds, since there is no appreciable wear of the sealing members and hence no appreciable destructive heat produced by their relative rotation. To keep the seal members from touching one another under design operating conditions a fluid pressure is created between the confronting seal faces which is greater than the pressure tending to bring the seal faces together, and the degree of separation is controlled by the action of the fluid as it passes between the faces to the low pressure side of the seal. At start-up of the equipment in which the seal is installed, the design fluid pressure is not available. This then results in contact between the seal faces while the pressure in the seal chamber is building up to the design pressure, and such contact, even though brief, may be sufficient to create a heat and wear condition at the faces sufficient to destroy the seal.

The object of this invention is to provide a gap seal which can be operated under zero or low pressure conditions without creating destructive heat and wear at the confronting faces of the relatively rotatable seal members.

The above object is attained in accordance with this invention by forming shallow spiral grooves in the outer periphery of one of the relatively rotatable seal members, preferably the stationary one, to create a pump, the direction of the spiral being such that the fluid to be sealed is forced between the seal members to separate and lubricate them at start-up. The spiral grooves, however, are effective in only one direction of relative rotation so that the seal is directional and may be objected to for that reason.

It is another object of this invention, therefore, to provide a gap seal which can be safely operated under zero or low pressure conditions which is not directional, so that it can be installed without regard to the direction of relative rotation of the seal members.

These and other objects of this invention will become apparent from the following detailed description of the preferred embodiment thereof shown in the accompanying drawing in which.

Figure 1:
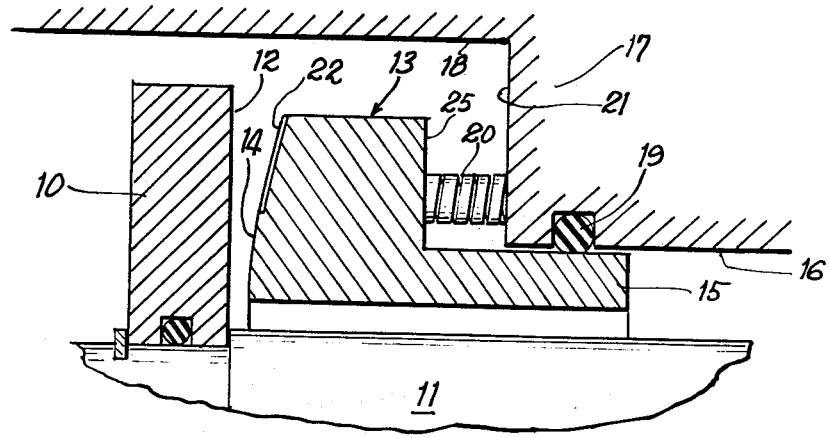
FIG. 1 is a fragmentary radial cross-section through a gap seal incorporating this invention.

Referring now to FIG. 1, the gap seal shown therein is comprised of a rotor 10 mounted on a shaft 11 and having a substantially radially disposed sealing surface 12 which has been appropriately lapped to be perfectly flat and smooth. The rotor 10 is preferably made in the form of a washer which is finished and lapped independently of shaft 11 and is then assembled with respect to said shaft, in a manner so as to be rotatable therewith. Adjacent rotor 10 and surrounding shaft 11 is a sealing washer or member 13 having a sealing surface 14 adjacent to and confronting sealing surface 12 on rotor 10. Washer 13 is formed with an axially extending sleeve 15 which fits into an appropriate opening 16 in a housing 17 through which shaft 11 extends. The opening 16 is enlarged at 18 to form a seal chamber in which the rotor 10 and sealing washer 13 may operate.

Seal chamber 18 is filled with a fluid, either a gas or a liquid, as the case may be, at any desired pressure above atmospheric. The pressure in opening 16, on the other hand, may be atmospheric pressure so that the fluid in seal chamber 18 tends to move radially inwardly between surfaces 12 and 14 and into the space between the sleeve 15 and shaft 11, to the opening 16. A seal of any suitable character, such as O-ring 19, supports sleeve 15 and sealing washer 13 resiliently in opening 16 to allow said sealing washer to move axially in opening 16, as well as radially, to a limited extent. A very light spring 20 may be retained between sealing washer 13 and the radial wall 21 of chamber 18 to urge washer 13 against rotor 10 when there is no pressure in chamber 18.

According to the theory of gap seals and the improved construction disclosed in my aforementioned copending application, sealing surface 14 is made slightly convex by a lapping operation to provide the necessary wedge-shaped space at the radially outer regions of sealing washer 13 to initiate and maintain the separation of the surfaces 12 and 14 under operating conditions. The actual separation at the low pressure side of surface 14 is on the order of 0.000050″ to 0.000500″ so that the separation shown in FIG. 1 is considerably exaggerated for purposes of illustration. The curvature of the surface 14 is likewise considerably exaggerated and would preferably be on the order of 2 to 30 light bands per inch of radius of the surface 14 measured with an optical flat under a monochromatic light. This is the equivalent of approximately 0.000025 to 0.000300 inch across surface 14. In theory, under operating pressures, sealing washer 13 will be pushed away from surface 12 a predetermined distance and will then maintain that distance or separation regardless of axial or radial movements of the rotor 10, the sealing washer 13 being compelled to follow such movements by the pressure effect of the fluid being sealed. This action is such that should any external forces be present tending to reduce the gap between surfaces 12 and 14, the forces of the fluid upon the movable sealing washer 13 will counter such external force and move washer 13 to the right, as shown in FIG. 1, until the designed gap is created. Similarly, should the external forces be such as to tend to increase the opening between surfaces 12 and 14 above the designed opening or gap, the said forces of the fluid will urge washer 13 to the left, as viewed in FIG. 1, to reduce the gap to the designed size.

Whenever the pressure of the fluid is below that for which the seal is designed to operate as a gap seal, and the sealing members are rotating relative to one another, sealing washer 13 will contact rotor 10 and thereby establish frictional contact between surfaces 12 and 14. This contact is augmented by spring 20, the function of which is to close the gap between surfaces 12 and 14 when the equipment is not operating and thereby prevent a leakage of the fluid along shaft 12 into opening 16 and also to prevent dirt particles and other harmful substances from getting between the seal surfaces 12 and 14. Although such contact is desirable when there is no relative rotation between the rotor 10 and sealing surface 13, it is however, highly undesirable as the relative speeds and pressures between surfaces 12 and 14 increase to the designed speeds and pressures, since even during the brief period that the equipment is getting up to speed or slowing down to stop, sufficient friction and heat can be generated to destroy the surfaces 12 and 14, particularly if the fluid sealed has low lubricating qualities is a gas.

Undesirable friction and heat are eliminated in accordance with this invention by forming in one of the surfaces 12 or 14 shallow spiral grooves, the hand of which is such as to cause fluid in chamber 18 to be forced radially inwardly, even at relatively slow speeds of rotation of rotor 10, across the inner regions of surfaces 12 and 14. A hydrodynamic wedge is thus created which provides sufficient pressure to separate the surfaces 12 and 14 and forms a film of the fluid being sealed on which the surface 12 rides. This, in turn, eliminates or prevents, any direct contact between surfaces 12 and 14 and prevents the generation of destructive friction and heat.

Figure 2:
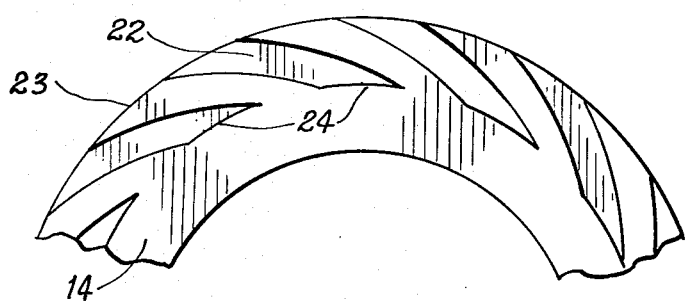
FIG. 2 is a fragmentary front elevational view of a sealing member of the seal of FIG. 1 showing the spiral grooves therein.

Referring to FIG. 2, the spiral grooves are shown at 22. The precise shape and size of the grooves depends largely upon the degree of effectiveness required of them. In the form shown in FIG. 2, they extend spirally inward across slightly more than one-half the surface 14. They should not of course, extend across the entire surface 14 since they would then provide a leak path across the seal. The area of the grooves illustrated is a little less than one-fourth the area of said surface. The groove depth, area, helix angle and the distance at which the grooves terminate may be varied to suit different operating conditions. The depth of grooves 22 is preferably two or three times the actual minimum clearance or gap between surfaces 12 and 14 when the seal is in operation.

The shallow grooves 22 may be formed in any one of a number of known ways, such, for example, as by etching, but I prefer to form them by an electro-plating process in which the areas to be formed as grooves are masked so that there is no metal deposited thereover. This may be accomplished by preparing a photographic silk screen in which everything but the spiral groove pattern is masked. An electroplate-resistant lacquer is silk-screened on the seal face in the areas where the grooves are desired. The lacquer is then dried and the metal plating is applied to the seal face, but does not adhere to the portion printed with lacquer, i.e., the groove design. The electro-deposition method permits wide flexibility as to the metal to be deposited and provides a means by which the actual sealing surface can be formed from an extremely hard material such as chromium for longer seal life.

Since the grooves 22 are spiraled, the relative direction of rotation between the surfaces 12 and 14 must be such as to cause the fluid to be forced radially inwardly through the grooves 32. This means that the surface 12 must rotate in the same direction as the direction in which the grooves 22 are spiraled. This, in turn, limits the use of the seal to an installation in which the shaft is rotating in the direction for which the seal is designed. Such limitation, however, can be eliminated by the construction shown in FIG. 3, to which reference is now made.

Figure 3:
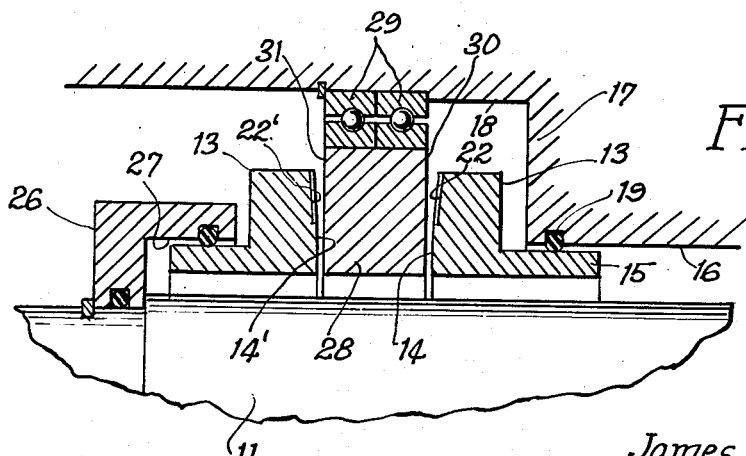
FIG. 3 is a fragmentary radial cross-section through a modification of the gap seal of FIG. 1 designed to be bidirectional.

In FIG. 3, the shaft 11 is shown passing through the opening 16 in the housing 17 in which is formed the seal chamber 18 and in which the washer 13 is retained as in FIG. 1. The rotor, however, is of different form and is shown at 26. Said rotor 26 has an axially extending recess 27, the diameter of which is substantially identical with the diameter of the opening 16, so as to be able to receive a sealing washer 13' which is identical to sealing washer 13, even as to the grooves 22'. It may be observed that when a washer 13 is reversed in its axial aspect so that it faces to the right, as shown in FIG. 3, instead of to the left, as shown in that figure, the direction of the spiral will likewise be reversed, so that the spiral grooves 22' tend to draw fluid radially inwardly when the spiral grooves 22 of washer 13 tend to move fluid radially outwardly, and vice versa.

Between washers 13 and 13' is disposed a ring 28 which is supported for rotation in bearings 29 suitably retained in housing 17 against axial movement therein. Ring 28 may be supported for rotation on shaft 11 with equal effectiveness, if it is desired to have bearings 29 out of the fluid being sealed. Sail ring 28 is provided with radially disposed flat lapped sealing surfaces 30 and 31 adapted to cooperate with the sealing surfaces 14 and 14' of washers 13 and 13', respectively.

In operation, assuming that the direction of rotation of shaft 11 is such as to cause the grooves 22' in washer 13' to move liquid outwardly and grooves 22 in washer 13 to move liquid inwardly, the outwardly moving liquid in grooves 22 would create a subatmospheric condition between the faces 14' and 31, which would cause washer 13' to bear frictionally against the ring 28 and thereby induce a rotation in said ring 28 relative to sealing washer 13. Such rotation of ring 28, however, would cause the desired gap to be formed between ring 28 and sealing washer 13, as described with reference to the FIG. 1 form, and hence would produce the desirable benefits of the FIG. 1 form. Should the direction of rotation of shaft 11 be in the opposite sense, then grooves 22' of washer 13' would pump liquid radially inwardly to establish the desired gap between surfaces 14' and 31, and the viscosity of the fluid in the gap would rotate ring 28 at a lesser speed than sealing washer 13' but in the same direction so as to cause an outward flow of fluid through grooves 22, which, in turn, would cause washer 13 to move to the left, as viewed in FIG. 3, to contact ring 28 and thus establish a seal thereat. The contact between surfaces 14 and 30 would create sufficient friction to tend to hold ring 28 against rotation at the speed of shaft 11 and such relative rotation as might occur between washer 13 and ring 28 would not be sufficient to create destructive heat, as would otherwise occur in a gapless seal in the same circumstances.

The addition of spiral grooves provides hydrodynamic load support for the washer 13, as well as the hydrostatic load support of a plain curved face seal, such as the one disclosed in my aforementioned application. Upon the start of rotation, fluid is pumped between the faces of the seal, and at a given RPM, the hydrodynamic load support becomes sufficient to give complete separation. The seal, therefore, is operable at zero pressure.

A deficiency may be present in the plain curved face gap seal when a non-compressible fluid, such as oil, is introduced between the faces of a seal which is intended to be operating in a gas environment. Such oil may be an ambient drop of lubricating oil from the system in general and may cover only a small portion of the surface of one of the seal members, that is, either the washer 13 or the rotor 10. Since the pressure profile across the face of that portion of the seal wetted by oil is different from the pressure profile across the portion of the seal sealing gas, the seal would tend to cock. This would cause contact of the seal members at certain points, notably where the gas is present and create destructive friction and heat at those points. The addition of spiral grooves to one of the seal members, however, gives a very large resistance to cocking due to the fact that the hydrodynamic lift (i.e. separating pressure of the pumped fluid) is inversely proportional to the square of the operating gap. Thus a great deal of additional load support is available when it is needed most. Gas seals of this type have been successfully operated while severely contaminated by oil.

The hydrodynamic load support generated by spiral grooves increases the ability of the axially movable member of the seal, such as washer 13, to follow the movements of the rotor 10. This is especially true at high speeds where excessive runout of the rotor would make such following movement, or "tracking" a problem.

As stated above, when a certain minimum pressure is exceeded, the curved face portion of the seal insures complete separation, and even at zero pressure, at any r.p.m. above that required for complete separation results in zero contact also. There is thus a small area of operation where contact is possible, and this would occur during start-up and shut-down at low pressure. This is not a serious problem, since both surface speed and face loading are very low under the conditions where contact occurs. When the spiral grooved seal is operated in liquids, or operated as a gas seal with contaminating oil present, there is usually sufficient lubrication present to tolerate zero pressure start-up and shut-down, with no damage. For seals operating in a dry gas atmosphere, a lubricant coating can be applied to the rotor without fear of causing cocking of the seal members. These coatings are extremely effective in the slow speed low pressure loading situation.

Since the spiral grooves produce a positive pumping action at low speeds, a small increase in leakage at such speeds will be experienced. As the operating gap becomes larger because of the greater speed, the hydrodynamic load support decreases and an equilbrium gap is therefore obtained. It is understood that the grooves may be formed in surface 12 of rotor 10 in FIG. 1, or in surfaces 30 and 31 of ring 28 instead of in the confronting surfaces on the sealing washers 13 and 13'. It is also understood that the curvature may be formed on the surface or surfaces of the rotor 10 or 28, with the grooved stator having a flat surface.

I claim:

1. A gap-type rotary mechancal seal comprising relatively rotatable sealing members having substantially radially disposed confronting sealing faces, one of said members being axially movable relative to the other member, said sealing faces being more widely separated at the high pressure side of the seal than at the low pressure side thereof and said movable member under operating conditions having a balance line at which opposing pressure by the fluid to be sealed acting upon said movable member are in equilibrium, means independent of fluid pressure for bringing said sealing faces into contact with one another under start-up conditions of the relatively rotatable sealing members, and means acting upon the fluid to be sealed for forcing said fluid between said members under start-up conditions to separate said members.

2. A gap-type rotary mechanical seal as described in claim 1, said means acting upon the fluid to be sealed comprising fluid pumping means on one of said members and discharging fluid between said sealing faces toward the low pressure side thereof.

3. A gap-type rotary mechanical seal as described in claim 1, said means acting upon the fluid to be sealed comprising a plurality of grooves in one of said faces disposed spirally on said one of said faces and terminating short of the low pressure side of said faces, said grooves extending from the high pressure side toward low pressure side and pumping fluid to be sealed between said faces at low relative rotation of said sealing members.

4. A gap-type rotary mechanical seal as described in claim 3, said grooves being of a depth which is greater than the axial dimension of the gap between said faces.

5. A gap-type rotary mechanical seal as described in claim 3, said grooves comprising masked portions of an electroplated metal on said one of said faces.

6. A gap-type rotary mechanical seal as described in claim3, said grooves comprising masked portions of an electroplated metal on said one of said faces, said metal being harder than the material of said one of said faces.

7. A gap-type rotary mechanical seal as described in claim 1, a driving shaft concentric with said sealing members, said other of said sealing members being freely rotatable relative to said shaft and having a sealing face on the side of said member opposite the first said sealing face, a third sealing member, means mounting said third sealing member for rotation with said shaft, said third sealing member being axially movable toward and away from said sealing face on the side of said member opposite the first said sealing face, said third sealing member having a sealing face adapted to produce a gap-type rotary seal with said other of said sealing members, and means acting upon the fluid to be sealed when the direction of relative rotation between the first said relatively rotatable members is reversed for forcing said fluid between said third member and said other of said members under low pressure conditions to separate said members.

8. A gap-type rotary mechanical seal as described in claim 7, said one sealing member and said third sealing member being substantially identical.

9. A gap-type rotary mechanical seal as described in claim 7, said one sealing member being in contact with said other sealing member when there is a gap between said third sealing member and said other sealing member.

10. A gap-type rotary mechanical seal as described in claim 7, said means acting upon the fluid to be sealed comprising fluid pumping means in the form of a plurality of grooves in the faces of said one sealing member and said third sealing member.

References Cited

UNITED STATES PATENTS

| 3,109,658 | 11/1963 | Barrett et al. | 277—3 |
| 3,347,552 | 10/1967 | Frisch | 277—27 |

FOREIGN PATENTS

| 230,697 | 3/1925 | Great Britain. |

SAMUEL ROTHBERG, Primary Examiner

U.S. Cl. X.R.

277—61, 63, 83, 96